United States Patent

Simpson

[15] 3,706,357
[45] Dec. 19, 1972

[54] ELEVATOR EMERGENCY ACTUATOR AND RESCUE UNIT

[72] Inventor: Joseph Elmer Simpson, 1407 N.E. 60th St., Fort Lauderdale, Fla. 33308

[22] Filed: March 30, 1970

[21] Appl. No.: 23,925

[52] U.S. Cl. ................................................187/29 R
[51] Int. Cl. ..............................................B66b 5/02
[58] Field of Search ........187/29; 307/66, 64; 320/40

[56] References Cited

UNITED STATES PATENTS

| | | | |
|---|---|---|---|
| 2,606,217 | 8/1952 | Raine et al.................. | 307/64 |
| 2,861,198 | 11/1958 | Soos, Jr. ..................... | 307/64 |
| 3,293,445 | 12/1966 | Levy............................ | 307/66 |
| 3,348,118 | 10/1967 | Watrous...................... | 320/40 |
| 3,469,657 | 9/1969 | Sgroi ........................... | 187/29 |

Primary Examiner—Bernard A. Gilheany
Assistant Examiner—W. E. Duncanson, Jr.
Attorney—Morse, Altman & Oates

[57] ABSTRACT

An auxiliary power unit is mounted in the power room and is connected to the operating system in such a way as to take over the operation of the elevator automatically in case of (a) loss of power to the elevator at the elevator disconnect switch, (b) loss of one or more phases of a three-phase power supply, (c) reversal of a phase, (d) if a call has not been answered within a predetermined time. When an auxiliary power unit goes into action it does a number of things including moving the car to the nearest floor level and opening the car and hoistway doors for passenger exit. The auxiliary power unit does not go into action if the safety circuit is open.

A solid state device is provided which (a) converts a 12-volt DC current to a 220-volt AC current, (b) automatically starts the recharge of the auxiliary power unit battery upon resumption of the regular power supply, (c) maintains the battery fully charged, and (d) prevents over-charging of the battery.

6 Claims, 4 Drawing Figures

INVENTOR.
JOSEPH ELMER SIMPSON
BY Moss, Altman & Oats
ATTORNEYS

INVENTOR.
JOSEPH ELMER SIMPSON
BY Morse, Altman + Oates
ATTORNEYS

ELEVATOR EMERGENCY ACTUATOR AND RESCUE UNIT

This invention relates to an auxiliary power unit for an automatically operated elevator, this unit being designed to act automatically in response to certain emergencies, moving the cart to the nearest floor level and opening the doors to permit exit of the passengers, and then to become inoperative until normal working conditions for the entire system have been restored.

The emergency power pack is designed to operate automatically upon failure of the normal power supply, a failure of a phase of a three-phase power supply, or a reversal of one of the phases. It will rescue under all failure conditions except the safety circuit and opening of the disconnect switch in the machine room.

The unit includes a solid state device which transforms the 12-volt direct current supplied by a battery installed in the machine room to a 220-volt alternating current required for the operation of the car and doors when the regular source of power has failed. The device has the added function of operating when the regular source of power is restored to re-charge the battery and to maintain the battery fully charged but to prevent any over-charge.

The invention can be applied to automatic elevators of any description and for installation in buildings having any number of floors served by the elevator. For relative simplicity of description, the invention is described and illustrated herein as applied to an oil-operated elevator serving a two-floor building.

Figure 1:
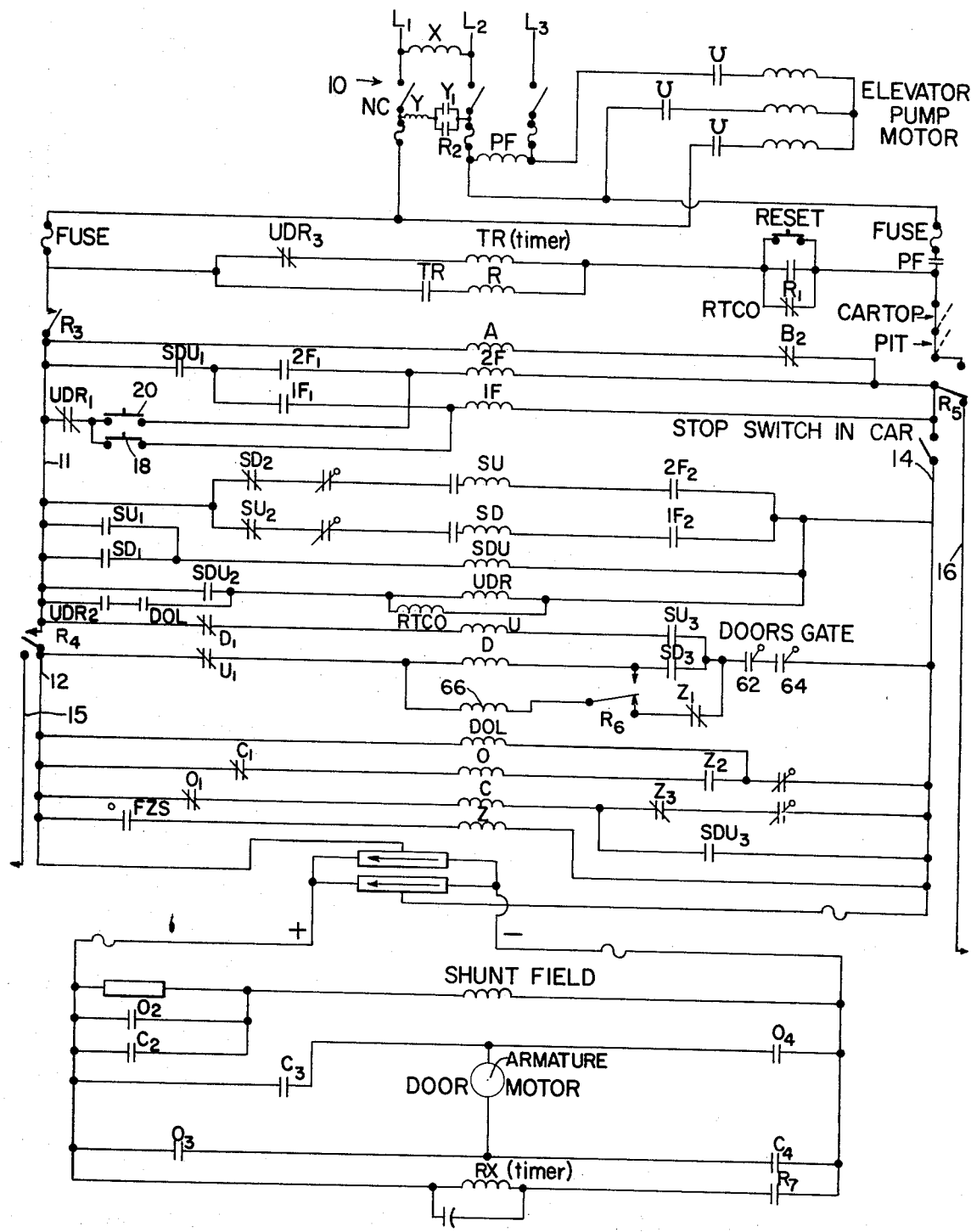
FIG. 1 is a wiring diagram of the essential features of an automatic elevator.

In FIG. 1 the normal power supply is 220-volt, 3-phase alternating current received from a suitable source through wires $L_1$, $L_2$, $L_3$ which are connected to a normally closed disconnect switch 10. FIG. 1 shows the condition of the system when the disconnect switch 10 is open, as shown, the various relay coils being de-energized and the various switches being open or closed as indicated. Two of the supply wires, $L_1$ and $L_2$, are connected by a relay coil X before they reach the disconnect switch 10. The coil X is thus energized when the power supply is normal, whether or not the disconnect switch is open.

If now the disconnect switch is closed, the following changes take place in the system. The relay coil PF becomes energized and closes the switch PF. If then the RESET button is momentarily pressed, the coil TR becomes energized and closes the switch TR (timing relay), thus energizing the coil R (rescue) which closes the switches $R_1$, $R_2$, $R_3$, $R_4$, $R_5$ and $R_6$. Of these switches, $R_1$ is a locking switch to keep the coil R energized after the RESET button is released. $R_2$, near the disconnect switch 10 is for a purpose hereinafter described. $R_3$ and $R_4$ connect the trunk line 11, 12 (at the left) to the power source. $R_6$ has functions hereinafter described. The system is now in condition for normal operation.

The circuits shown in FIG. 1 extending from the trunk lines 11 and 12 to the trunk line 14 are standard equipment for accepting calls from the car or a hall, closing the car and hall doors, moving the car to the selected floor zone, and opening the car and hall doors upon arrival. These circuits and their operation need not be described in detail, being obvious to any experienced elevator technician.

When a car or hall call is initiated by pressing a push button, a series of relays operate to open the switch $UDR_3$ (up or down relay) which is in series with the coil TR. This coil is thus de-energized but the switch TR is provided with a delay device timed to open the switch after a period twice as long as the normal running time for the longest run of the car. This gives the car ample time to reach its destination in normal operation before the switch TR can open. If the run is completed in normal time, the coil UDR is de-energized, closing the switch $UDR_3$ and re-energizing the coil TR so that the switch TR remains closed. A stop switch in the car prevents registering of calls from actuating, timing for rescue if the car stop switch is open. In that condition the car doors will open anyway.

Figure 2:
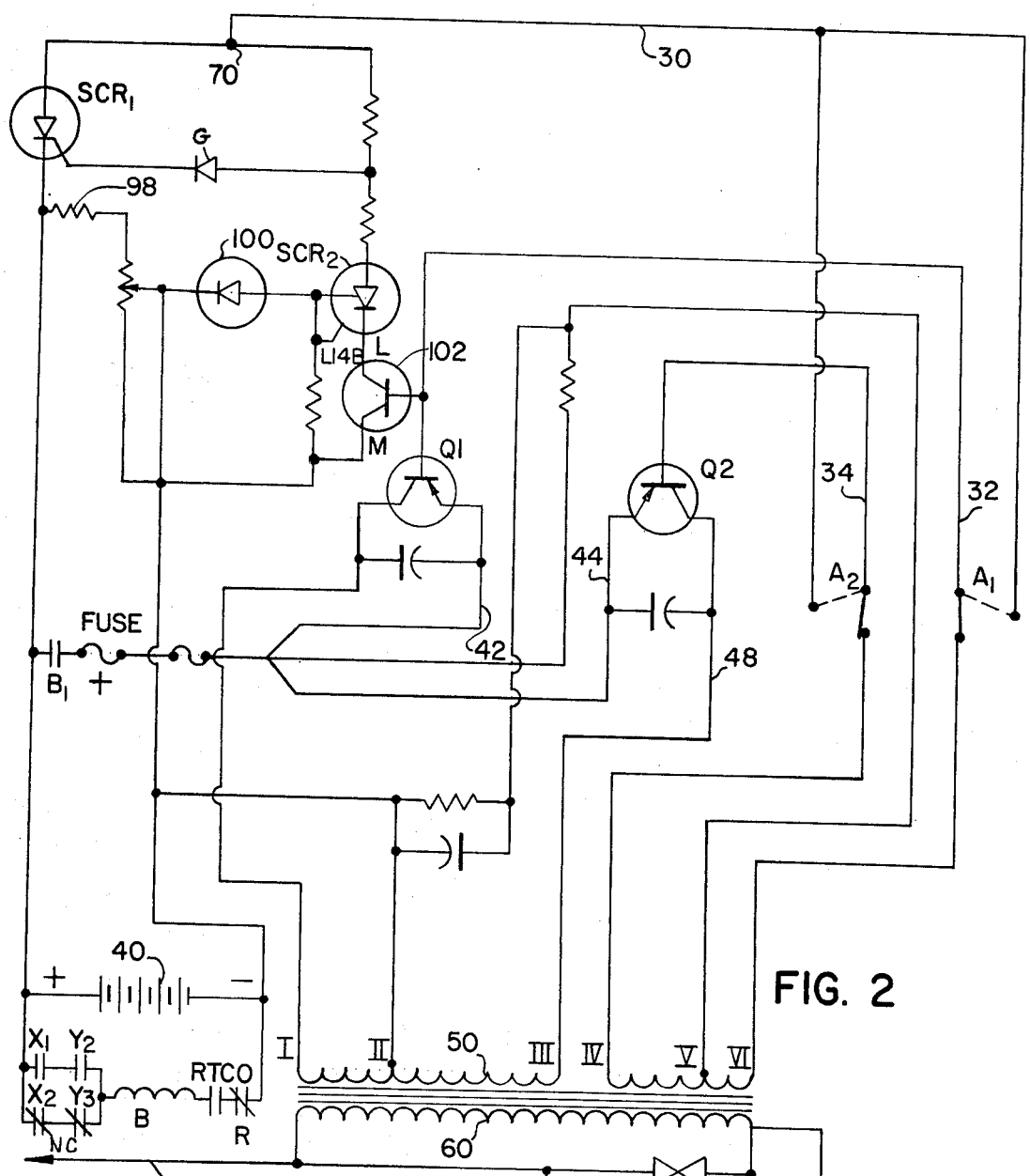
FIG. 2 is a diagram of the auxiliary unit on the car, including means for automatically recharging the battery when normal power is restored, and for maintaining the battery at full charge without overcharging.

If the car does not complete its run within the delay period, the switch TR opens and the coils R and RTCO (rescue timer cutout) are de-energized. The R switches revert to the positions shown in FIG. 1. The switches $R_3$ and $R_4$ open to disconnect the trunk line segments 11 and 12 from the normal power source and from each other. The switch $R_5$ disconnects the trunk line 14 from the normal power source and connects it to the line 16 which with the line 12 connects the auxiliary power unit (FIG. 2) to the portions of the circuitry shown in FIG. 1 necessary for the emergency operation of the car and doors. The coil A which is energized when the system is in condition for normal operation, is de-energized when disconnected by the switches $R_3$ and $R_5$ from the normal power source. This changes the two switches $A_1$ and $A_2$ (FIG. 2) to the positions indicated by full lines, thus connecting the bases of transistors $Q_1$ and $Q_2$ to the primary coil 50 of a transformer at the points VI and IV, respectively.

The auxiliary power is supplied from a suitable battery 40 e.g., a 12-volt storage battery, such a battery being mounted through an inverter which feeds 220-volt AC current through the wires 12 and 16 to parts of the operating mechanism illustrated in FIG. 1, when the switch $B_1$ (FIG. 2) is closed. This switch is operated by energization of a relay coil B in a shunt control circuit around the battery 40. During normal operation, the switch RX is open and the switch RTCO is closed. In case of an emergency such as a power failure, the RX and RTCO coils are de-energized, but both have timers to delay the operation of the corresponding switches. The RX delay is to prevent activation of the auxiliary power unit if the failure of the normal power is only momentary. It is, therefore, short so that the switch RX soon closes to complete the control circuit through the coil B, thus closing the switch $B_1$ and connecting the battery 40 to the inverter illustrated in FIG. 2. The timer for the coil RTCO is set to delay the opening of the switch RTCO sufficiently to provide time for the emergency operation of the car and doors to be completed. When the switch RTCO opens, the coil B is de-energized and the whole system is inoperative until the fault is corrected and the re-set switch is manually closed.

When the switch $B_1$ closes, it connects the positive terminal of the battery 40 to the emitters 42, 44 of the transistors $Q_1$ and $Q_2$. The collector 46 of $Q_1$ conducts to the point I of the transformer winding 50 and back from the point II to the negative terminal of the battery 40. The collector 48 and of $Q_2$ conducts to the point III of the transformer winding 50 and back from the point II to the negative pole of the battery 40. The transistors fire alternately, inducing in the secondary coil 60 of the transformer alternating currents. The firing of the transformers is triggered by the polarity of their bases which are respectively connected by lines 32 and 34 to the transformer coil 50 at points VI and IV.

This arrangement operates in a well-known manner to induce a magnified alternating current in the secondary coil 60 of the transformer which is connected to the wires 12 and 16 to carry alternating current to the car and door operating mechanisms, the circuits for which extend between the lines 12 and 14.

If an emergency such as a power failure occurs, the auxiliary power supply is automatically connected to the lines 12 and 14. If this occurs when a car is between floors, the floor zone switch FZS on the car is in its open position and the coil Z (FIG. 1) is not energized. The door and gate switches 62 and 64, the switch $Z_1$ and the switch $U_1$ are closed. Since the coil R is de-energized, the switch $R_1$ is in the position indicated in FIG. 1. Hence some of the auxiliary power supplied to the lines 12 and 14 energizes the coil 66 which controls the lowering valve so that the car moves to the floor level next below. When it reaches that level, the switch FZS closes, energizing the coil Z. This opens the switch $Z_1$ to de-energize the coil 66 and closes the switch $Z_2$ to cause the doors and gate to open in the usual manner. If the failure occurs when a car is at a floor level, the switch FZS is closed and the coil Z will at once be energized to cause the doors and gate to open. When the delay period of the timer RTCO ends, the coil B becomes de-energized, opening the switch $B_1$ to disconnect the battery 40 from the emitters of the transistors $Q_1$ and $Q_2$, thereby turning off the emergency power supply from the circuits shown in FIG. 1. To resume normal operation, the fault which caused the failure of the system must be corrected, then the reset button must be pressed. When the power is resumed, if the system is normal then the normally closed RTCO contact will reset the system for normal operation. This will energize the coil R and operate the R switches as hereinbefore described. The contacts of the $R_2$ switch serve to prevent the rescue unit from being energized when the disconnect switch 10 is closed until the reset button has been pressed or until the contacts of the RTCO switch has had a chance to set the circuits for normal operations. Since the de-energization of the coil B has resulted in the closing of the switch $B_2$ (in series with coil A), the restoration of normal power to the system will energize the coil A and shift the switches $A_1$ and $A_2$ (FIG. 2) to the positions indicated by broken lines, thus connecting the bases of the transistors $Q_1$ and $Q_2$ to a line 30 which branches at 70, one line going through a diode $SCR_1$ to the positive terminal of the battery 40, the other branch going through a diode $SCR_2$ to the negative terminal of the battery which is also connected to the transformer coil 50 at the point II. The circuitry illustrated in FIG. 2 then operates to recharge the battery 40 to full capacity and to maintain it thus without overcharging.

As the energization of the coil R has resulted in the transformer coil 60 being connected to the normal power supply, an alternating voltage is maintained in the coil 60.

Figure 3:
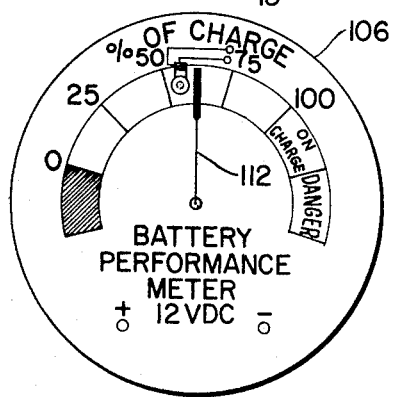
FIG. 3 is a front elevation of battery charging control unit.
Figure 4:
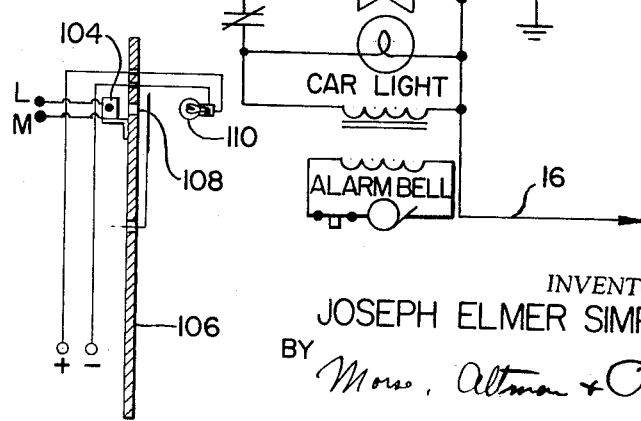
FIG. 4 is a view in side elevation thereof.

The battery charging circuit is through $SCR_1$ to the positive side of the battery 40. The voltage through a resistor 98 emits to a Zener diode 100 which turns on and conducts at 8.2 volts, for example, to gate on $SCR_2$ through a light activated device 102, shown in detail in FIGS. 3 and 4. The device 102 typically includes a light detector 104 such as GEL14B connected at junctions L and M in the battery charging circuit. The device provides a visual indicator and control over the battery condition. The detector 104 is mounted on one side of a meter dial face 106 in register with an aperture 108. A light source 110 is mounted on the opposite side of the face 106 and in register with the aperture. An indicator needle 112 responsive to the charge on the battery is adapted to move between the light source and the detector cutting off the light to the detector when the battery charge drops to 50 percent. This will result in keeping L14B turned on and positively turning off the by pass current while turning on the battery charging current through $SCR_1$. It will be understood that when the voltage divider is conducting through $SCR_2$ it will gate off $SCR_1$. The battery charging current passing through lead 30 will be alternating one-half cycle D.C. current.

The battery is charged through $SCR_1$ with the voltage at gate G keeping $SCR_1$ conducting. As the battery voltage builds up to the trigger point of the diode 100, then $SCR_2$ turns on to by-pass $SCR_1$. The device 102 conducts as long as the battery is above a 50 percent charge, but when the battery charge drops below 50 percent the device 102 stops conducting, eliminates the by-pass and allows gate G to turn on $SCR_1$.

The car light, either normal or separate, as well as the emergency alarm are connected between the leads 15 and 16 to be energized automatically in the event of a power failure. This arrangement conforms to building codes without requiring an extra emergency battery operated lamp.

I claim:

1. In an elevator system having a car adapted to travel in a hoistway and to stop at a plurality of floor levels, hoist means, door and gate operating means, control means for said hoist means and operating means including a disconnect switch and trunk lines between an electric power supply and said hoist means, the improvement comprising an auxiliary power unit, said unit including actuating means responsive automatically to a malfunction of said power supply and unresponsive to an opening of said disconnect switch and said actuating means including delay means responsive to a malfunction of said control means to electrically connect said auxiliary power unit to said trunk lines to move said car to the next lower floor level and open the door and gate at that level, said auxiliary power unit including a storage battery, said actuating means including a rescue relay and a timing relay connected in parallel, said timing relay including delay contacts in series with said rescue relay and car direction contacts in series with said timing relay whereby said delay contacts will de-energize said rescue relay after a predetermined delay, said rescue relay being operatively connected to said trunk lines, an inverter connected to said battery and adapted to deliver an alternating current to said trunk lines at a voltage sufficient to operate said hoist means.

2. In the elevator system of claim 1, said auxiliary power unit including battery charging means connected to said battery and adapted when connected to the normal power supply to charge said battery and maintain it fully charged without overcharging and means responsive to resumption of standard power for actuating said charging means.

3. In the elevator system in claim 2 wherein said battery charging means includes a meter connected to said battery, a light detector and light source mounted in operative association to said meter, a needle movable between said detector and said source for controlling said detector, said detector being operatively connected to said battery and adapted to control charging current to said battery according to the position of said needle.

4. In the elevator system of claim 1 including lighting means within said car and operatively connected to said auxiliary power unit.

5. In the elevator system of claim 1 including an alarm connected to said auxiliary power unit and energized by a malfunction.

6. In the elevator system of claim 1 including reset means connected to said system and responsive to resumption of normal power after interruption to return said system to a normal condition.

* * * * *